(12) United States Patent
Hirabayashi et al.

(10) Patent No.: US 7,616,270 B2
(45) Date of Patent: Nov. 10, 2009

(54) ELECTRO-OPTICAL DEVICE, AND PROJECTOR AND ELECTRONIC APPARATUS INCLUDING THE SAME

(75) Inventors: Hidekazu Hirabayashi, Shiojiri (JP); Tomoaki Miyashita, Shimosuwa-machi (JP); Masafumi Sakaguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 11/708,310

(22) Filed: Feb. 20, 2007

(65) Prior Publication Data
US 2007/0195222 A1 Aug. 23, 2007

(30) Foreign Application Priority Data
Feb. 21, 2006 (JP) ............................. 2006-043475

(51) Int. Cl.
*G02F 1/1333* (2006.01)
(52) U.S. Cl. ...................................................... 349/59
(58) Field of Classification Search ............... 349/58–59
See application file for complete search history.

(56) References Cited

U.S. PATENT DOCUMENTS 4,222,641 A * 9/1980 Stolov ........................ 353/84
7,057,678 B2 * 6/2006 Ishida et al. .................. 349/58

FOREIGN PATENT DOCUMENTS

| JP | 60-080432 | | 6/1985 |
|---|---|---|---|
| JP | 2003-121817 | A | 4/2003 |
| JP | 2003-248214 | A | 9/2003 |
| JP | 2004-35600 | A | 2/2004 |
| JP | 2005-215201 | A | 8/2005 |

* cited by examiner

*Primary Examiner*—Jerry T Rahll
(74) *Attorney, Agent, or Firm*—AdvantEdge Law Group, LLC

(57) ABSTRACT

An electro-optical device includes a liquid crystal device; a holder that holds the liquid crystal device; and an incident window bored through the holder, the incident window allowing a light beam emitted from a light source to be transmitted therethrough to the liquid crystal device. A window frame of the incident window has low reflectivity portions having a low reflectivity of diagonal light toward the liquid crystal device, the diagonal light being included in the light beam directed to the window frame.

4 Claims, 12 Drawing Sheets

ELECTRO-OPTICAL DEVICE, AND PROJECTOR AND ELECTRONIC APPARATUS INCLUDING THE SAME

BACKGROUND

1. Technical Field

The present invention relates to an electro-optical device in which generation of an optical leakage current in a liquid crystal device due to diagonal light included in a light beam from a light source is suppressed, thereby preventing generation of irregular image regions due to optical leakage, and a projector and an electronic apparatus including the same.

2. Related Art

Two types of projectors for projecting and displaying an enlarged image on a screen are known. One type is a so-called three-panel projector including a light source, a color separation optical system that separates a light beam emitted from the light source into three light components for red (R), green (G), and blue (B) using dichroic mirrors, three light-modulating liquid crystal devices that modulate the associated separated light components in accordance with image information, and a color-synthesis optical device that combines the light components modulated by the associated light-modulating liquid crystal devices. The other type is a single-panel projector and includes only one light-modulating liquid crystal device and a color generator.

A liquid crystal light valve, which is an exemplary light-modulating liquid crystal device, includes two transparent substrates, such as glass substrates or quartz substrates, and a liquid crystal layer sealed between the two substrates. Active elements such as thin-film transistors (hereinafter abbreviated as "TFTs") are arranged in a matrix on one substrate, and a counter electrode is arranged on the other substrate, thereby allowing optical characteristics of the liquid crystal layer sealed between the two substrates to be changed according to an image signal to display an image.

The liquid crystal light valve (light-modulating liquid crystal device) structured as described above has no fixture. As disclosed in JP-A-2004-35600, the liquid crystal light valve is accommodated and held in place in a holder made of metal or the like, and the holder is fixed using a fixture such as a screw to an incident end face of the light-synthesis optical device.

In the liquid crystal light valve, irradiation of a channel region or a drain end of each of the TFTs placed on one substrate (TFT array substrate) with strong light induces an optical leakage current and thus changes the characteristics of the TFTs, resulting in uneven image quality, a reduction in contrast ratio, and deterioration of flicker characteristics of a display surface.

To avoid these problems, a light-shielding film (black matrix) for shielding a channel region and a channel-adjacent region of each of the TFTs from light is formed at least in a portion of the other substrate (counter substrate) facing each of the TFTs, thereby preventing the TFTs from being irradiated with strong light.

Recent liquid crystal projectors have a high output lamp as a light source in order to enhance the luminance and the resolution of a projected image, and are also designed to improve the efficiency of using light. With regard to this luminance improvement, the liquid crystal light valve (light-modulating liquid crystal device) has pixels with a large numerical aperture to improve the transmittance of projection light. Also, the number of pixels is increased to enhance the resolution.

The larger the number of pixels, the larger an effective pixel region becomes. This narrows a margin between a window frame of an incident window (through which a light beam is transmitted) bored in a holder that holds the liquid crystal light valve and an end of the effective pixel region of the liquid crystal light valve (hereinafter referred to as an "effective pixel end"), which is orthogonal to a light incident direction, compared with that in a known liquid crystal light valve.

When the margin between the effective pixel end of the liquid crystal light valve and the window frame of the incident window becomes narrower, part of diagonal light included in a light beam emitted from the light source is transmitted to the window frame of the incident window and is reflected therefrom to enter the TFTs, thereby generating an optical leakage current. As a result, irregular pixels in the form of a double cross are often generated near the end of the effective pixel region of the liquid crystal light valve (hereinafter referred to as "optical leakage irregular pixels").

To avoid such unpleasant effects, the aperture area of the incident window is increased to provide a wide margin with the effective pixel end. In this way, generation of optical leakage irregular pixels can be avoided. Since edge portions of the window frame of the incident window function as fixture surfaces for fixing the incident-side outer periphery of the liquid crystal light valve (light-modulating liquid crystal device), the incident window cannot be enlarged greater than needed to fix the liquid crystal light valve in the holder in a stable state.

SUMMARY

An advantage of some aspects of the invention is that it provides an electro-optical device in which a liquid crystal device is stably held in place in a holder without enlarging an incident window formed through the holder, thereby reducing reflectivity of diagonal light emitted to a window frame of the incident window toward the liquid crystal device, and preventing generation of optical leakage irregular pixels, and a projector and an electronic apparatus including the same.

An electro-optical device according to an aspect of the invention includes a liquid crystal device; a holder that holds the liquid crystal device; and an incident window bored through the holder, the incident window allowing a light beam emitted from a light source to be transmitted therethrough to the liquid crystal device. A window frame of the incident window has low reflectivity portions having a low reflectivity of diagonal light toward the liquid crystal device, the diagonal light being included in the light beam directed to the window frame.

With the structure described above, the window frame has the low-reflectivity portions with a low reflectivity toward the liquid crystal device. Thus, the liquid crystal device can be fixed in a stable state without enlarging the incident window. Since reflection of diagonal light transmitted to the window frame is reduced, generation of optical leakage irregular pixels in the liquid crystal device can be effectively prevented.

It is preferable that the low-reflectivity portions be formed at edge portions of an incident side of the window frame by sharpening the edge portions.

With the structure described above, the edge portions are sharp. Thus, reflection of diagonal light transmitted to the edge portions toward the liquid crystal device is reduced, and hence, optical leakage irregular pixels generated in the liquid crystal device can be effectively prevented.

It is preferable that the low-reflectivity portions be formed at walls of the window frame by tapering the walls parallel to a tilt angle of the diagonal light or at an angle greater than the tilt angle so that the walls extend toward the liquid crystal device.

With the structure described above, the walls of the window frame are formed in a tapered shape parallel to the tilt angle of the diagonal light or at an angle greater than the tilt angle so that the walls are extended toward the liquid crystal device. Thus, no diagonal light is transmitted to the walls, and hence, optical leakage irregular pixels generated in the liquid crystal device can be further prevented.

It is preferable that the low-reflectivity portions be formed at edge portions of an incident side of the window frame by fabricating the edge portions to have a recessed cross section.

With the structure described above, the edge portions are formed to have a recessed cross section. Thus, most of the diagonal light directed to the edge portions is reflected by the low-reflectivity portions parallel to a display surface of the liquid crystal device or in the direction away from the display surface. Thus, optical leakage irregular pixels generated in the liquid crystal device can be effectively prevented.

It is preferable that the low-reflectivity portions be formed by forming a low-reflectivity layer around a periphery of the window frame.

With the structure described above, the window frame has the low-reflectivity layer. Thus, the shape of the window frame remains as it has in the past, and hence high versatility can be achieved.

It is preferable that the low-reflectivity layer be formed by a painting, coating, or plating process using a material with a high light absorptivity.

With the structure described above, the low-reflectivity layer is formed by a painting, coating, or plating process using a material with a high light absorptivity. Thus, the holder need not be fabricated by post processing, and the production thereof can be facilitated. The material of the low-reflectivity layer can be freely selected, and hence, generation of optical leakage irregular pixels in the liquid crystal device can be more effectively prevented.

A projector according to another aspect of the invention includes the above-described liquid crystal device; a light source that emits a light beam to the electro-optical device; and a projection lens that enlarges and projects an image from the electro-optical device onto a screen.

With the structure described above, the projector includes the above-described electro-optical device. Thus, an image enlarged and projected on the screen has no irregularity due to optical leakage, and hence, a high-quality image can be ensured.

An electronic apparatus according to another aspect of the invention includes the above-described electro-optical device.

With the structure described above, the electronic apparatus includes the above-described electro-optical device. Thus, no irregular image regions are generated due to optical leakage in the electro-optical device of the electronic apparatus, and a high-quality image can be ensured.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
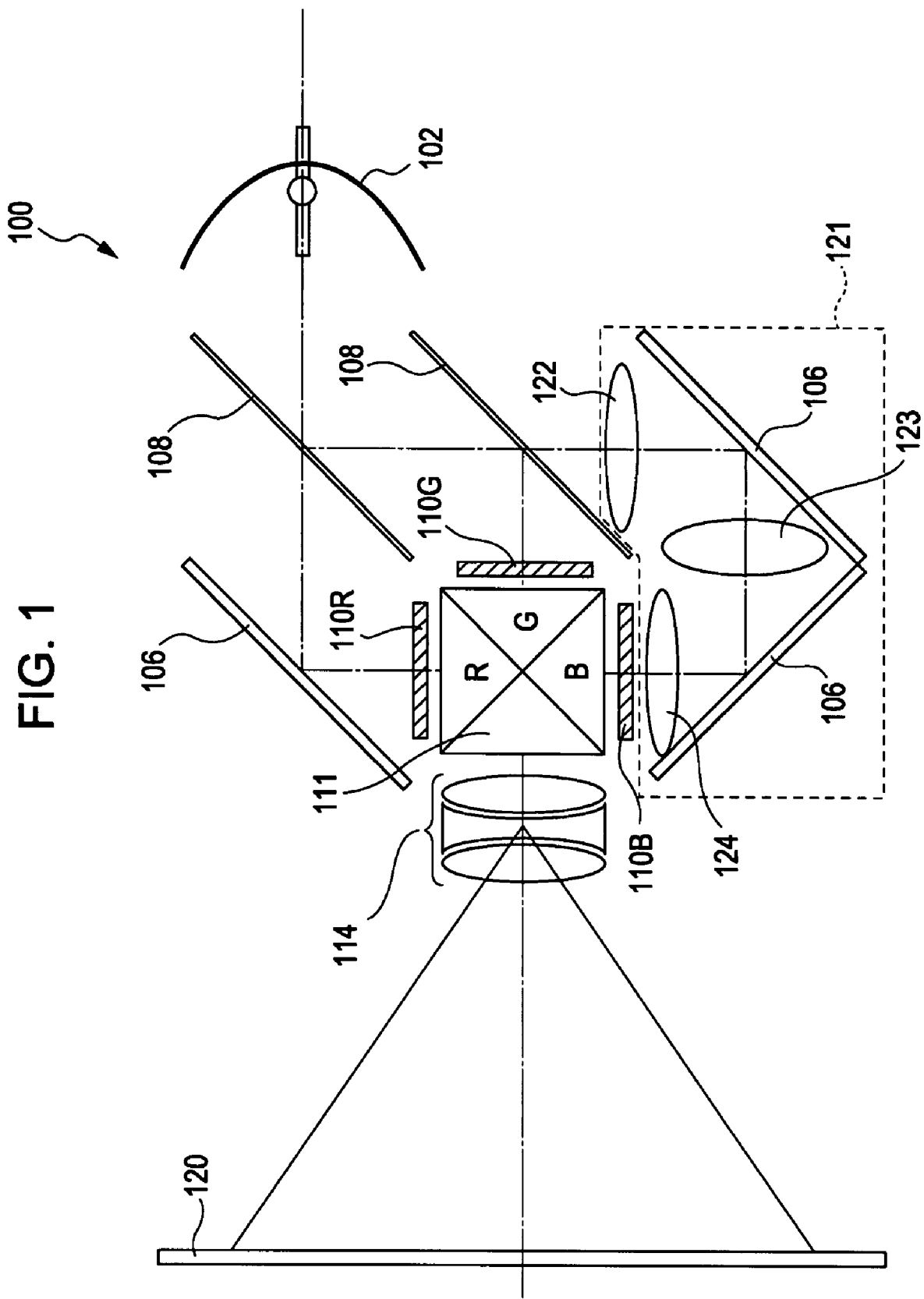
FIG. 1 is a schematic diagram of a color liquid crystal projector according to a first embodiment.
Figure 2:
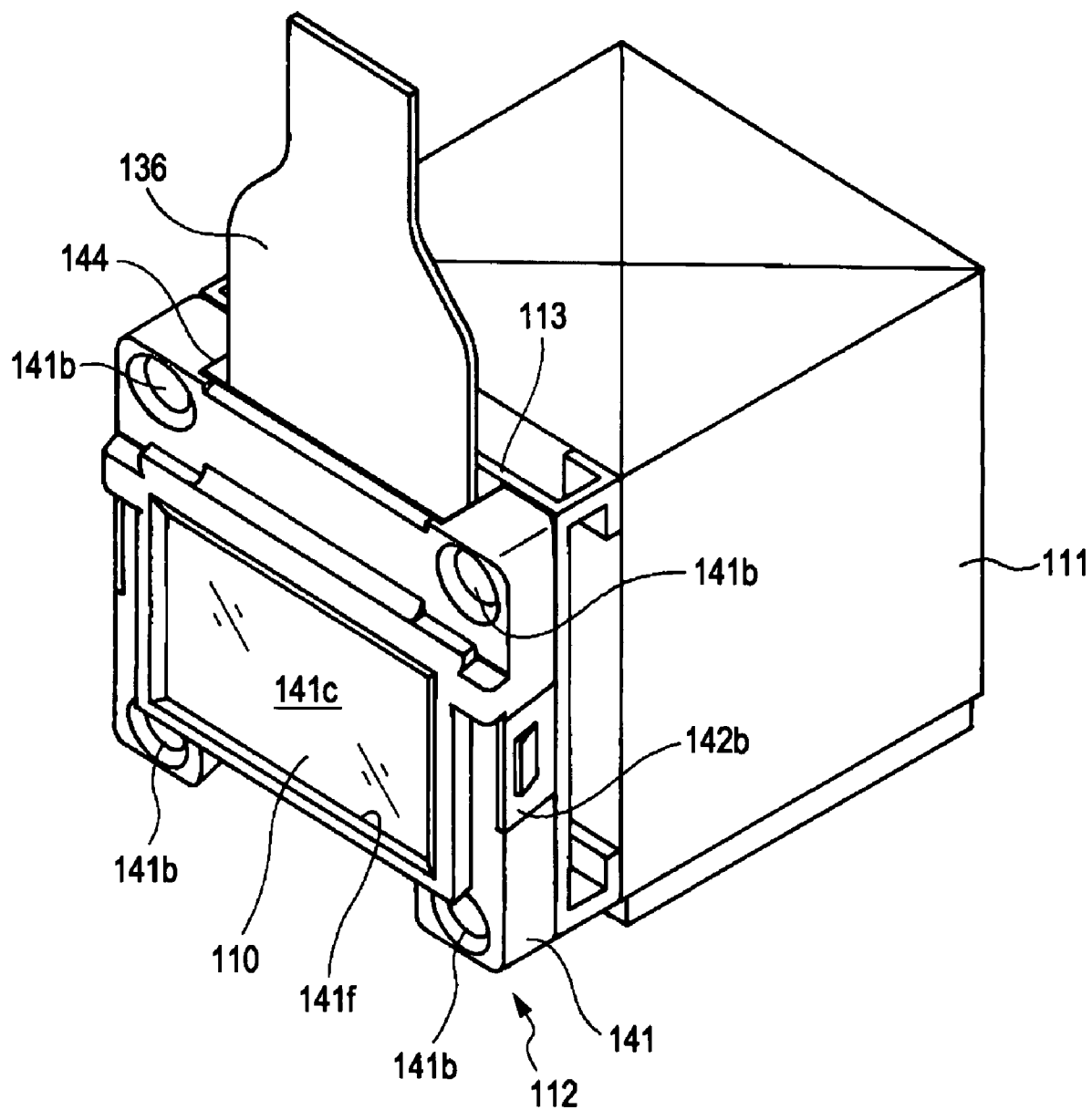
FIG. 2 is a perspective view of a holder that holds a liquid crystal light valve, the holder being attached to a dichroic prism.
Figure 3:
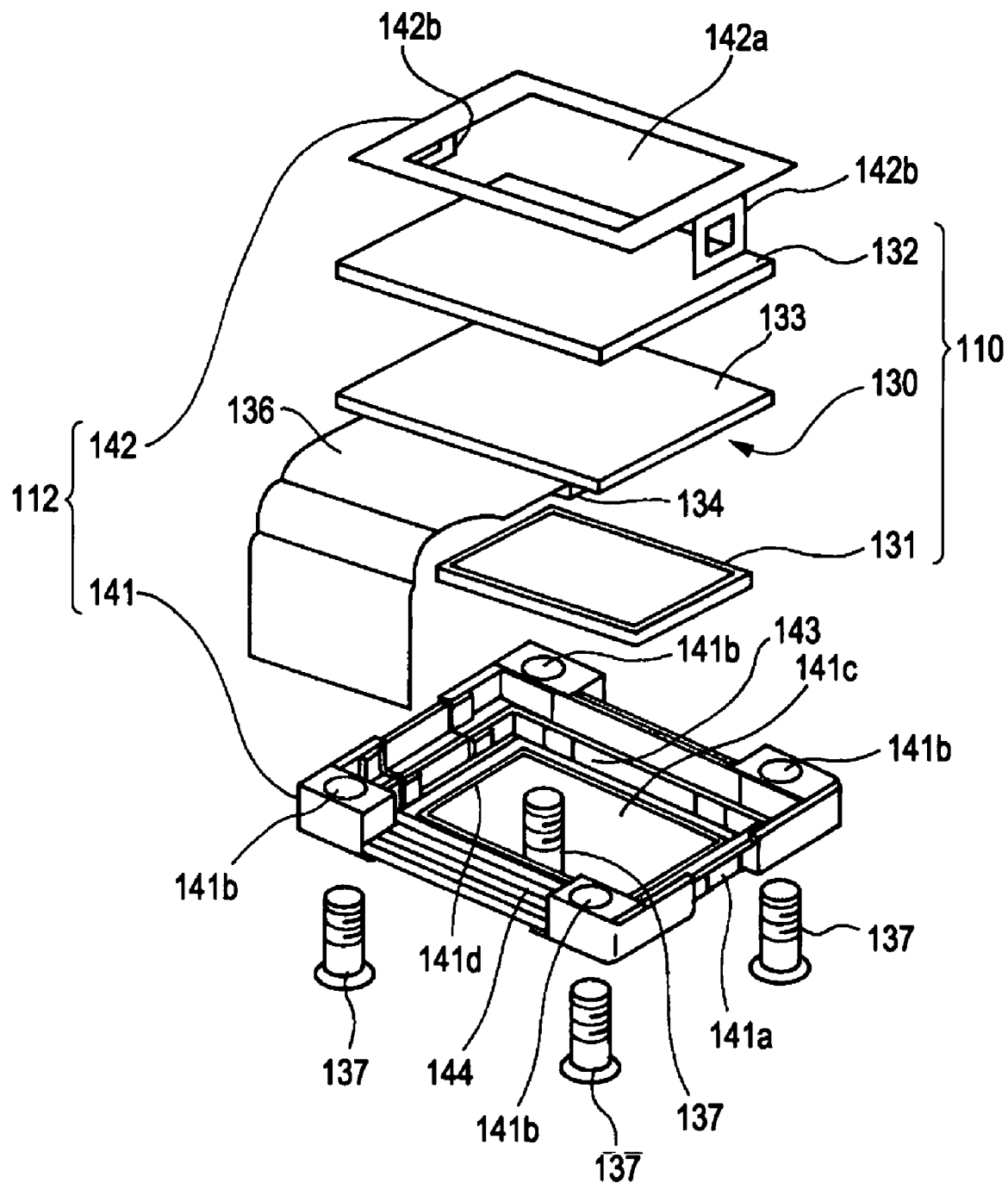
FIG. 3 is an exploded perspective view of the holder and the liquid crystal light valve.

Embodiments of the invention will be described with reference to the drawings. FIGS. 1 to 9 show a first embodiment of the invention. FIG. 1 is a schematic diagram of a color liquid crystal projector. FIG. 2 is a perspective view of a holder that holds a liquid crystal light valve, the holder being attached to a dichroic prism. FIG. 3 is an exploded perspective view of the holder and the liquid crystal light valve.

As shown in FIG. 1, a color liquid crystal projector unit serving as an exemplary electronic apparatus includes a liquid crystal projector 100 and a screen 120. The liquid crystal projector 100 includes three liquid crystal light valves 110R, 110G, and 110B, each having a liquid crystal light valve main unit (light-modulating liquid crystal device) 130 for modulating a light beam of its associated color R, G, or B.

In the liquid crystal projector 100, when projection light is emitted from a lamp unit 102 having a white light source such as a metal halide lamp or the like, the projection light is separated by three mirrors 106 and two dichroic mirrors 108 into light components R, G, and B corresponding to three primary colors, which are individually directed in accordance with image information to the light-modulating liquid crystal light valves 110R, 110G, and 110B, respectively. In particular, the light component B is guided through a relay lens system 121 including an incident lens 122, a relay lens 123, and an emitting lens 124 to reduce or prevent the loss of light due to its long optical path.

The light components R, G, and B modulated by the light valves 110R, 110G, and 110B, respectively, are combined by a dichroic prism 111 serving as a color-synthesis optical device and are then projected as a color image via a projection lens 114 onto a screen 120 facing the projection lens 114. As a result, an enlarged image is displayed on the screen 120. Since the liquid crystal light valves 110R, 110G, and 110B have the same structure, they are collectively referred to as the "liquid crystal light valves 110" in the following description.

As shown in FIG. 2, each of the liquid crystal light valves 110 is accommodated and held in a holder 112. The holder 112 and the liquid crystal light valve 110 constitute an electro-optical device. The holder 112 is fixed via a fixing plate 113 to an incident side of the dichroic prism 111. A known emitting-side polarization plate (not shown) is held by the fixing plate 113.

As shown in FIG. 3, each of the liquid crystal light valves 110 includes the liquid crystal light valve main unit 130 having a planar and substantially rectangular shape and dustproof glass plates 131 and 132 adhered to an incident side and an emitting side of the liquid crystal light valve main unit 130, respectively. In FIG. 3, the dustproof glass plates 131 and 132 are shown as being separated from the liquid crystal light valve main unit 130 for convenience.

In the liquid crystal light valve main unit 130, a TFT array substrate 133 (substrate on which a plurality of line electrodes, pixel electrodes, and TFTs electrically connected therebetween are formed) and a counter substrate 134 (substrate on which a common electrode is formed) are arranged so as to face each other via a sealing member 135 (see FIGS. 6 and 7) disposed therebetween. Liquid crystal (electro-optical material) is sealed in a space hermetically sealed by the sealing member 135 between the two substrates 133 and 134. A flexible connector 136 is connected to an external circuit connection terminal (not shown) disposed on the TFT array substrate 133.

Figure 6:
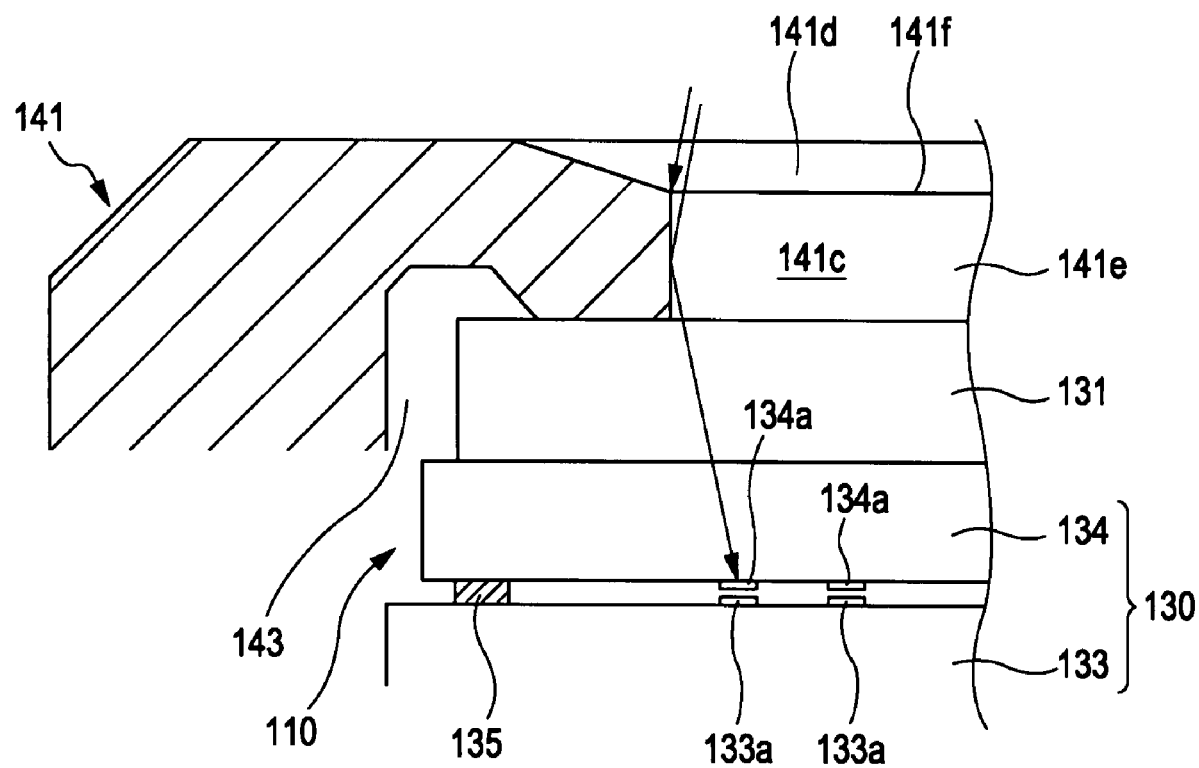
FIG. 6 is an enlarged view of portion VI in FIG. 4.
Figure 7:
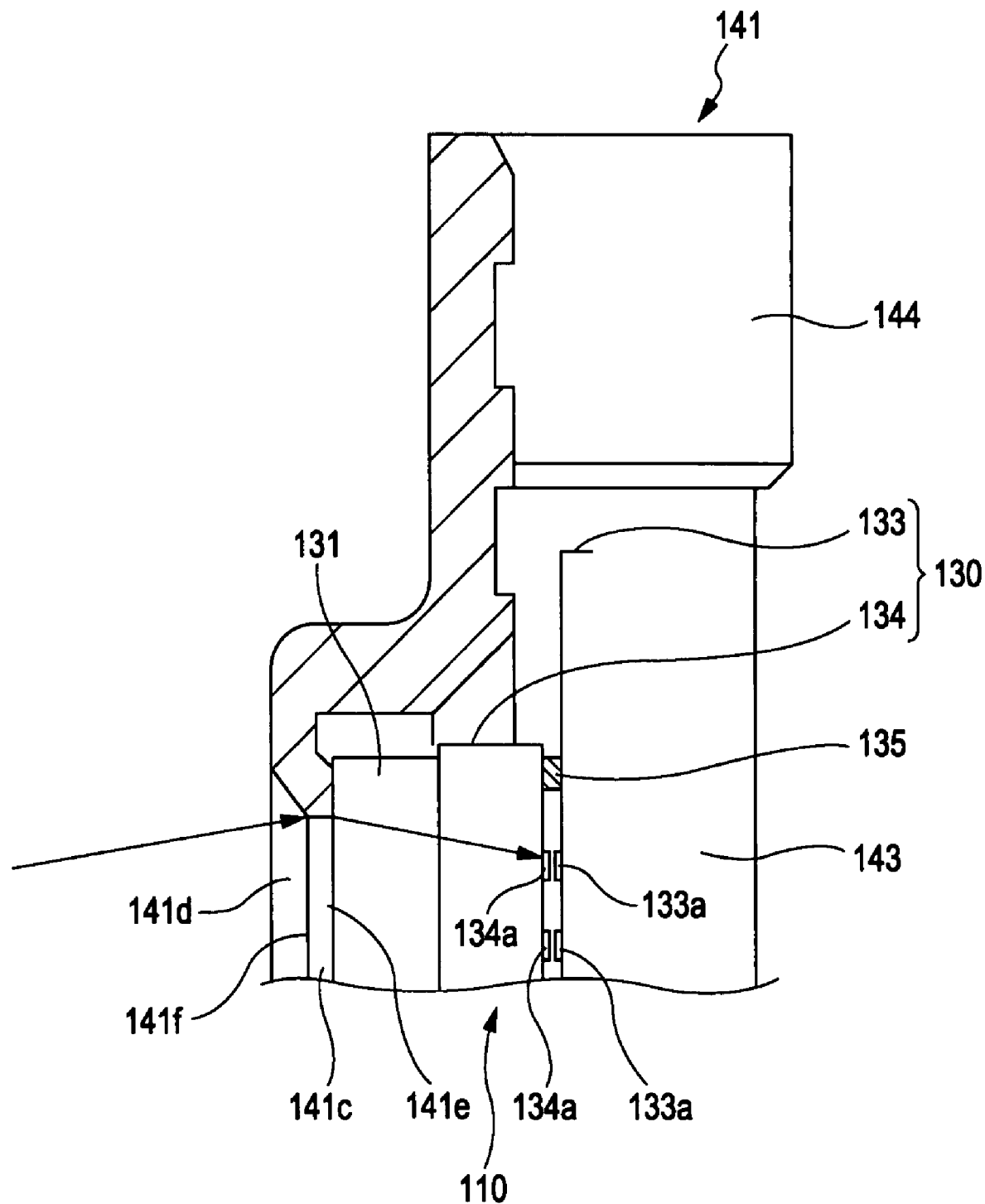
FIG. 7 is a cross-sectional view taken along the line VII-VII in FIG. 5.

As shown in FIGS. 6 and 7, channel regions of the TFTs and channel adjacent regions (hereinafter these are collectively referred to as "TFT elements 133a" for convenience) are provided in an effective pixel region of the TFT array substrate 133 so that the pixels are defined. Light-shielding films (black matrices) 134a are formed in portions of the counter substrate 134 facing the TFT elements 133a so that no light beam directly enters the TFT elements 133a. In FIGS. 6 and 7, only the TFT elements 133a and the light-shielding films 134a near an effective pixel end are shown.

The holder 112 includes a holding frame 141 that accommodates and holds the liquid crystal light valve 110 and a frame member 142 that engages with the holding frame 141 and presses and fixes the liquid crystal light valve 110 accommodated therein in place.

The frame member 142 is a metal plate fabricated from a flat plate, and an emitting window 142a is formed in the frame member 142. The emitting window 142a faces the rectangular effective pixel region (where an image is formed) of the liquid crystal light valve main unit 130 accommodated in the holding frame 141, and the emitting window 142a is larger than the effective pixel region. Hooks 142b are bent at the left and right sides of the frame member 142. Hook receivers 141a with which the hooks 142b are engaged are disposed on the holding frame 141.

The holding frame 141 is a diecast molded or forged part made of aluminum alloy or the like. Insertion holes 141b into which screws 137 serving as fixtures are inserted are bored at four corners of the holding frame 141. In addition, a container 143 for accommodating the liquid crystal light valve 110 is formed in the holding frame 141. A notch 144 for allowing the flexible connector 136 to extend to the outside is formed at one side (top side in FIG. 5) of the container 143.

An incident window 141c into which projection light from the lamp unit 102 is introduced is formed at the incident side of the container 143. The incident window 141c faces the effective pixel region of the liquid crystal light valve main unit 130 and has a similar shape but slightly larger than the effective pixel region. Alternatively, the size of the incident window 141c may be the same as that of the effective pixel region.

Figure 4:
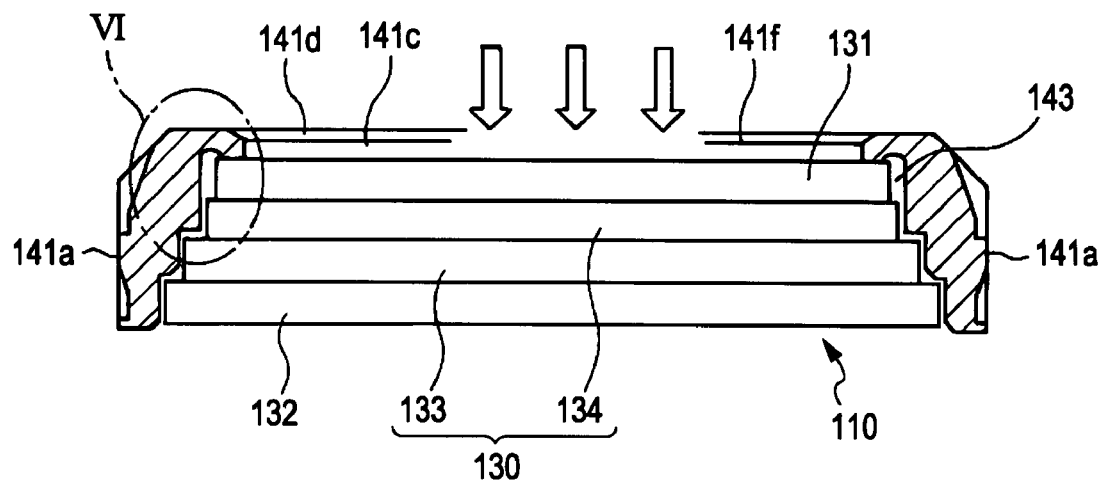
FIG. 4 is a cross-sectional view taken along the line IV-IV in FIG. 5.
Figure 5:
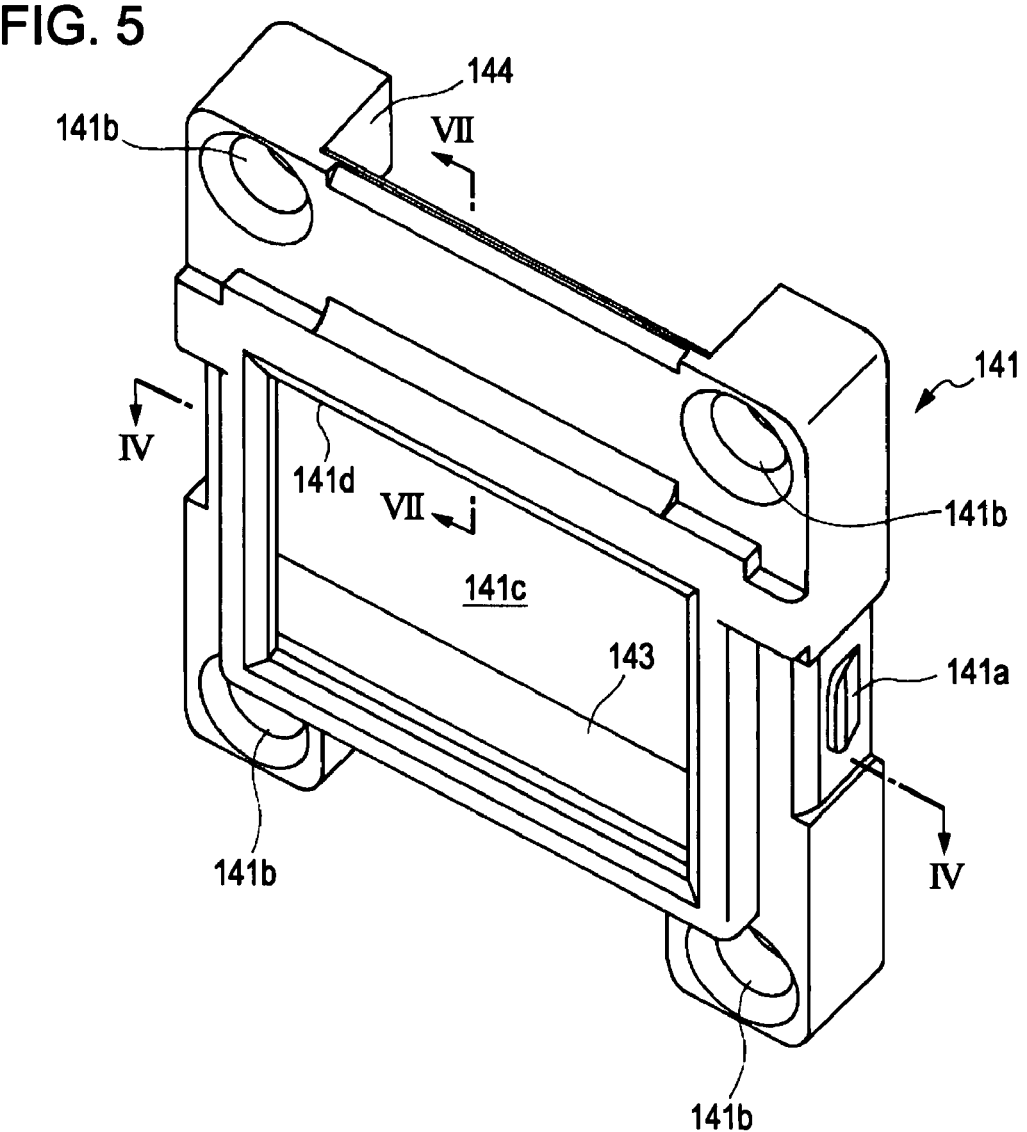
FIG. 5 is a perspective view of a holding frame.

As shown in FIG. 4, when the liquid crystal light valve 110 is mounted in the container 143, the outer periphery of the dustproof glass plate 131 attached to the surface of the counter substrate 134 abuts on the inner periphery of the incident window 141c, and the exterior of the dustproof glass plate 132 attached to the surface of the TFT array substrate 133 is exposed to the end face of the opening of the holding frame 141. Although not shown in FIG. 4, a space between each lateral side of the liquid crystal light valve 110 and a wall of the container 143 is filled with a molding material such as a photocurable adhesive or the like. With the molding material, the liquid crystal light valve 110 is fixed at a predetermined position in the container 143.

The frame member 142 is mounted on the side of the holding frame 141 (bottom side in FIG. 4), to which the dustproof glass plate 132 attached to the TFT array substrate 133 is exposed, and the bent hooks 142b at the left and right sides thereof engage with the hook receivers 141a of the holding frame 141, thereby fixing the outer periphery of the dustproof glass plate 132 in place.

As shown in FIGS. 6 and 7, walls 141e of a four-sided window frame 141d of the incident window 141c formed through the holding frame 141 are arranged at right angles to the display surface (effective pixel region) of the liquid crystal light valve 110. In addition, incident-side edge portions 141f of the four sides of the window frame 141d constitute low-reflectivity portions. In the first embodiment, the edge portions 141f substantially have a sharp radius of curvature R (about 0 to 0.4 mm), and hence the edge portions 141f serve as low-reflectivity portions.

Various techniques for fabricating the edge portions 141f to have a sharp radius of curvature R are available. For example, if the holding frame 141 is a diecast molded part, when a mold is patterned to have cavities corresponding to the edge portions 141f, edges of the cavities are processed using a grinder such as an end mill or the like with high precision. In this way, the edge portions 141f can be fabricated at one time by one molding process. Alternatively, mating surfaces of the mold are arranged at positions corresponding to the edge portions 141f, and parting lines formed after the molding process are removed by post processing, thereby sharpening the edge portions 141f. If the shapes of the parting lines substantially have a negligible effect on the sharp radius of curvature R, post processing may be omitted, and the parting lines may remain unremoved.

If the holding frame 141 is a part fabricated by plastic forming, such as forging or pressing, the edge portions 141f can be formed by sharpening edges of a die or a punch for forming the incident window 141c, which correspond to the edge portions 141f. Needless to say, the edge portions 141f may be sharpened by stamping or cutting after the holding frame 141 is formed.

Next, the operation of the first embodiment will now be described.

As shown in FIG. 3, the liquid crystal light valve 110 in which the dustproof glass plates 131 and 132 are attached to two sides of the liquid crystal light valve main unit 130 is accommodated and fixed at a predetermined position in the container 143 arranged in the holding frame 141. The frame member 142 abuts on the side (to which the emitting side of the dustproof glass plate 132 is exposed) of the holding frame 141 for holding the liquid crystal light valve 110. The hooks 142b formed on the two sides of the frame member 142 are engaged with the hook receivers 141a formed in the holding frame 141, thereby pressing the peripheral portion of the dustproof glass plate 132.

As shown in FIGS. 6 and 7, the periphery of the incident side of the dustproof glass plate 131 attached to the counter substrate 134 of the liquid crystal light valve 110 accommodated in place in the container 143 of the holding frame 141 abuts on the edge of the container 143 having the incident window 141c formed in the holding frame 141. The incident window 141c has a similar shape but slightly larger than the effective pixel region of the liquid crystal light valve main unit 130.

As shown in FIG. 2, the holder 112 including the holding frame 141 for holding the liquid crystal light valve 110 and the frame member 142 is fixed by the screws 137 to an incident side of the dichroic prism 111 via the fixing plate 113. In accordance with the light beams R, G, and B, there are three incident sides of the dichroic prism 111. The holders 112 are fixed to these incident sides via the fixing plates 113, respectively.

After the dichroic prism 111 that holds the holders 112 for holding the liquid crystal light valves 110 corresponding to the light beams R, G, and B is mounted at a predetermined position onto the liquid crystal projector 100, as shown in FIG. 1, when projection light is emitted from the lamp unit 102, this light beam passes through the incident windows 141c of the holding frames 141 and enters the liquid crystal light valves 110.

The light beam projected from the lamp unit 102 includes not only light components parallel to the emission direction, but also diagonal light components. These diagonal light components are tilted by about 10° to 15° with respect to the light beam projection direction. Since the diagonal light components enter each liquid crystal light valve 110 at acute angles, the light-shielding films 134a shield the TFT elements 133a disposed on the TFT array substrate 133 so that the TFT elements 133a are not irradiated with light.

With regard to the diagonal light components directed to the walls 141e of the four sides of the window frame 141d, since the walls 141e are disposed at right angles to the display surface of the liquid crystal light valve 110, the diagonal light components reflected from the walls 141e enter the liquid crystal light valve 110 at substantially the same angle as that of the diagonal light components included in the projection light from the lamp unit 102. Therefore, the TFT elements 133a will not be irradiated with the diagonal light components reflected from the walls 141e.

Furthermore, with regard to the diagonal light components directed to the edge portions 141f of the incident side of the window frame 141d, since the edge portions 141f substantially have the sharp radius of curvature R, many of these diagonal light components are reflected at least parallel to the display surface of the liquid crystal light valve 110 or in the direction away from the display surface. Thus, the number of diagonal light components entering the liquid crystal light valve 110 is reduced.

As a result, almost no diagonal light components reflected from the window frame 141d disposed at the four sides of the incident window 141c formed through the holding frame 141 are directed to the TFT elements 133a, thereby effectively preventing generation of optical leakage irregular pixels due to optical leakage. Since almost no diagonal light components reflected from the window frame 141d are directed to the TFT elements 133a, the liquid crystal light valve 110 can be fixed in a stable state without unnecessarily enlarging the incident window 141c greater than the effective pixel area of the liquid crystal light valve 110.

Figure 8:
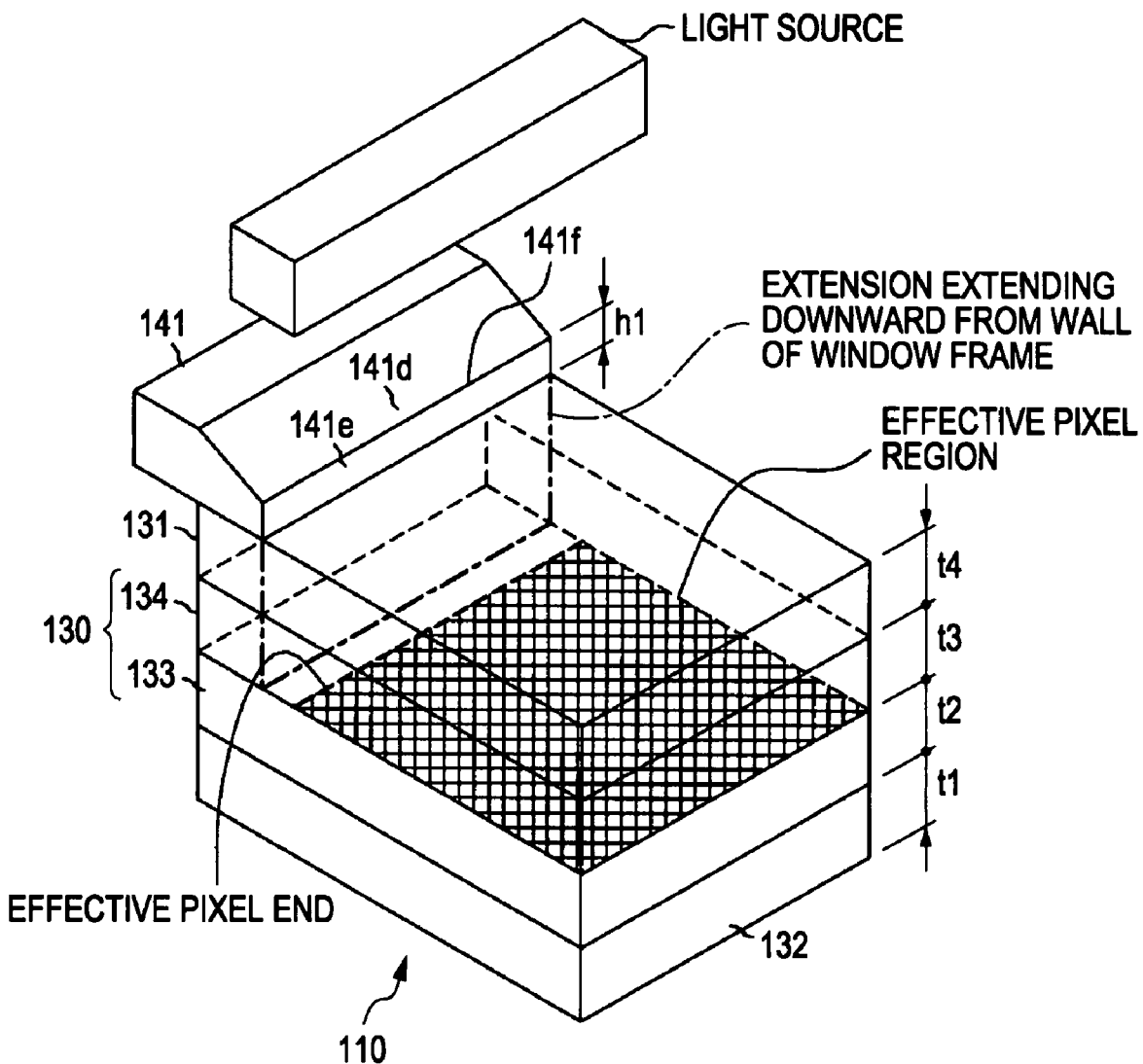
FIG. 8 is a diagram of a geometric model for use in an analysis simulation.
Figure 9:
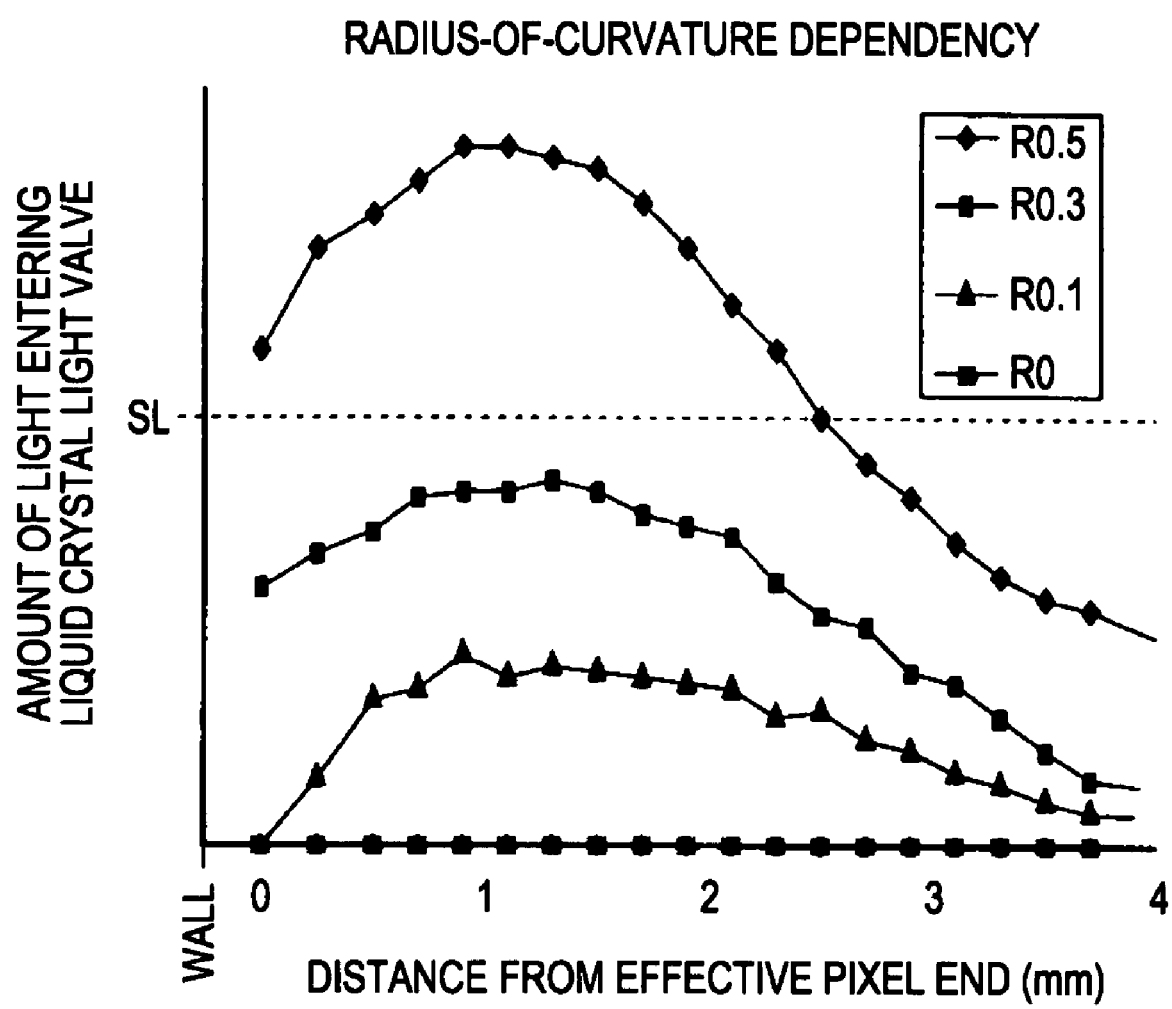
FIG. 9 is a graph showing a distribution of amounts of light entering the liquid crystal light valve, which are obtained by the analysis simulation.

With reference to FIGS. 8 and 9, an analysis simulation using a computer will be described. FIG. 8 shows a geometric model for use in the analysis simulation. FIG. 9 shows a distribution of amounts of light entering the liquid crystal light valve, which are obtained by the analysis simulation. For convenience, in FIG. 8, the same reference numerals are used to denote the same blocks as those in the first embodiment, and descriptions thereof are given using the same component names.

In the analysis simulation, the radius of curvature R of the edge portion 141f of the window frame 141d is changed, and, in this state, the amount of light entering the liquid crystal light valve 110 is measured.

The geometric model data is as follows. The liquid crystal light valve 110 includes the dustproof glass plate 132, the TFT array substrate 133, the counter substrate 134, the dustproof glass plate 131, and the holding frame 141. The effective pixel region is set on the TFT array substrate 133, and the effective pixel region is divided into 22×30=660 cells. In addition, the light source emits light at an angle (tilt angle 15°) corresponding to the diagonal light to the edge portion 141f of the window frame 141d. The light emitted from the light source is composed of 200,000 light beams at an almost parallel angle (scattering angle is 0.1°).

The radius of curvature R of the edge portion 141f is set to four types, i.e., R0 mm, R0.1 mm, R0.3 mm, and R0.5 mm, and the number of light beams hitting the edge portion 141f and then the cells of the effective pixel region, that is, the amount of light emitted to the effective pixel region, is measured.

The analysis results obtained by the analysis simulation are shown in FIG. 9. As shown in FIG. 9, in any of the geometric models, the greatest amount of light is measured at a position of about 1 mm from the effective pixel end. This amount of light is compared with a predetermined slice level SL. The slice level SL is set by obtaining, from an experiment or the like, the amount of light with which optical leakage irregular pixels in the form of a double cross are observed.

With reference to the light amount distribution shown in FIG. 9, it is estimated that optical leakage irregular pixels are generated when the radius of curvature R of the edge portion 141f is R0.5 mm, and no optical leakage irregular pixels are generated when the radius of curvature R is R0 mm, R0.1 mm, and R0.3 mm. Since it is realistically impossible to set the radius of curvature R of the edge portion 141f to R0 mm, it can be considered that no problem will be caused by setting the radius of curvature R of the edge portion 141f to about R0.3 mm to R0.4 mm.

Figure 10:
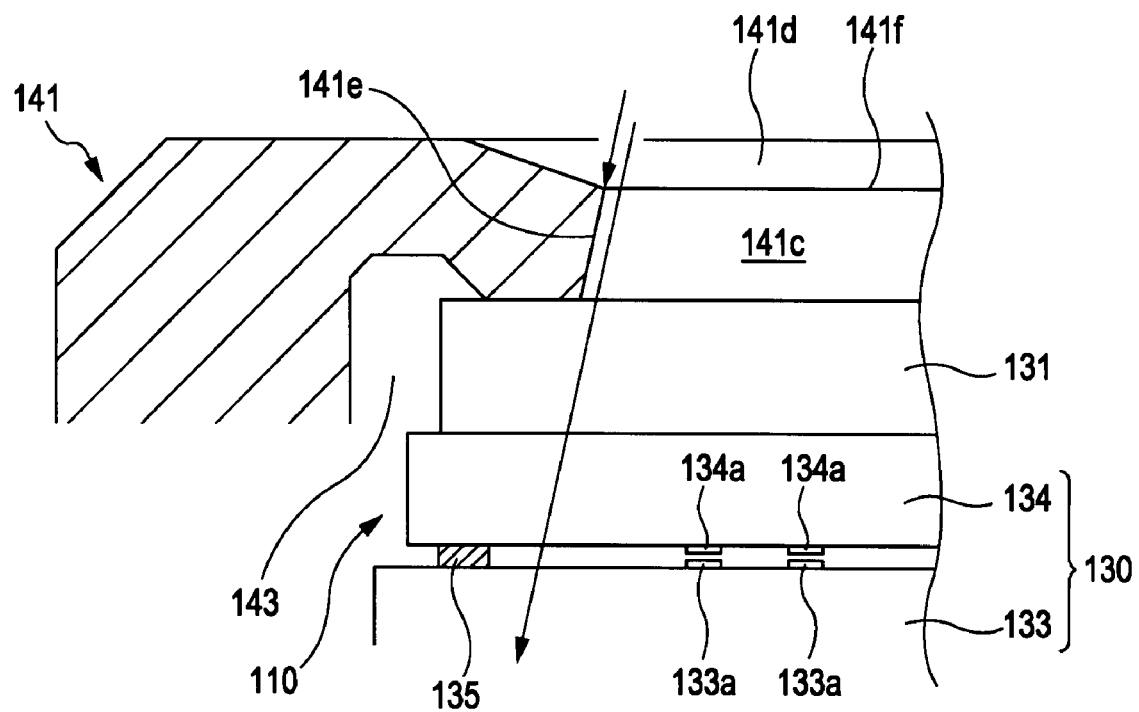
FIG. 10 is an enlarged cross-sectional view, corresponding to FIG. 6, according to a second embodiment.

FIG. 10 is an enlarged cross-sectional view, corresponding to FIG. 6, according to a second embodiment. In FIG. 10, the same reference numerals are used to denote the same blocks as those shown in FIG. 6 to simplify the description.

In the second embodiment, besides the edge portions 141f, the walls 141e additionally serve as low-reflectivity portions. That is, in the second embodiment, each wall 141e is tapered in the direction extending from the edge portion 141f toward the container 143. As a result, the wall 141e is prevented from being irradiated with diagonal light.

As has been described above, diagonal light enters at an angle of 10° to 15° with respect to the light projection direction. Thus, when the wall 141e is tapered toward the container 143 at a tilt angle of about 10° to 15°, there will be no diagonal light directed to the wall 141e, and hence no light will be reflected from the wall 141e. As a result, no light is directed to the TFT elements 133a, resulting in a further reduction in generation of optical leakage current. Furthermore, diagonal light reflected from the edge portion 141f is prevented from being reflected again from the wall 141e near the edge portion 141f. That is, there will be no double reflection. Accordingly, generation of optical leakage current is further reduced.

Figure 11:
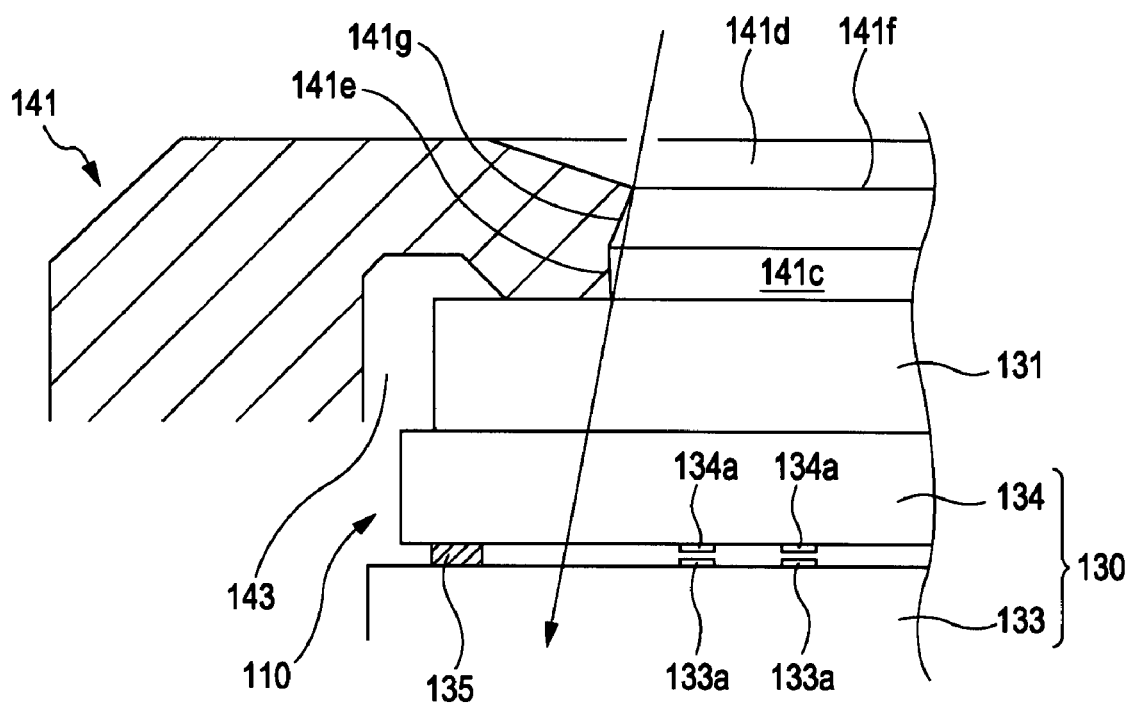
FIG. 11 is an enlarged cross-sectional view, corresponding to FIG. 6, according to a third embodiment.

FIG. 11 is an enlarged cross-sectional view, corresponding to FIG. 6, according to a third embodiment. In FIG. 11, the same reference numerals are used to denote the same blocks as those shown in FIG. 6 to simplify the description.

The third embodiment is a modification of the second embodiment described above. The wall 141e is halfway tapered (the tapered half being toward the edge portion 141*f*) at a tilt angle greater than the tilt angle (about 10° to 15°) of diagonal light so that the wall 141*e* extends in the direction from the edge portion 141*f* toward the container 143, thereby allowing the wall 141*e* to serve as a low-reflectivity portion. The remaining wall 141*e* toward the container 143 is a vertical side, as in the first embodiment.

A line connecting the edge of the vertical side of the wall 141*e* toward (the emitting side of) the container 143 and the edge portion 141*f* toward the incident side is tilted at an angle equal to or greater than the tilt angle of the diagonal light. As in the first embodiment, the edge portion 141*f* substantially has a sharp radius of curvature.

According to the third embodiment, as in the second embodiment, there is almost no diagonal light reflected from the walls 141*e*, and the above-described double reflection is also prevented. Therefore, the generation of optical leakage current is further reduced.

Figure 12:
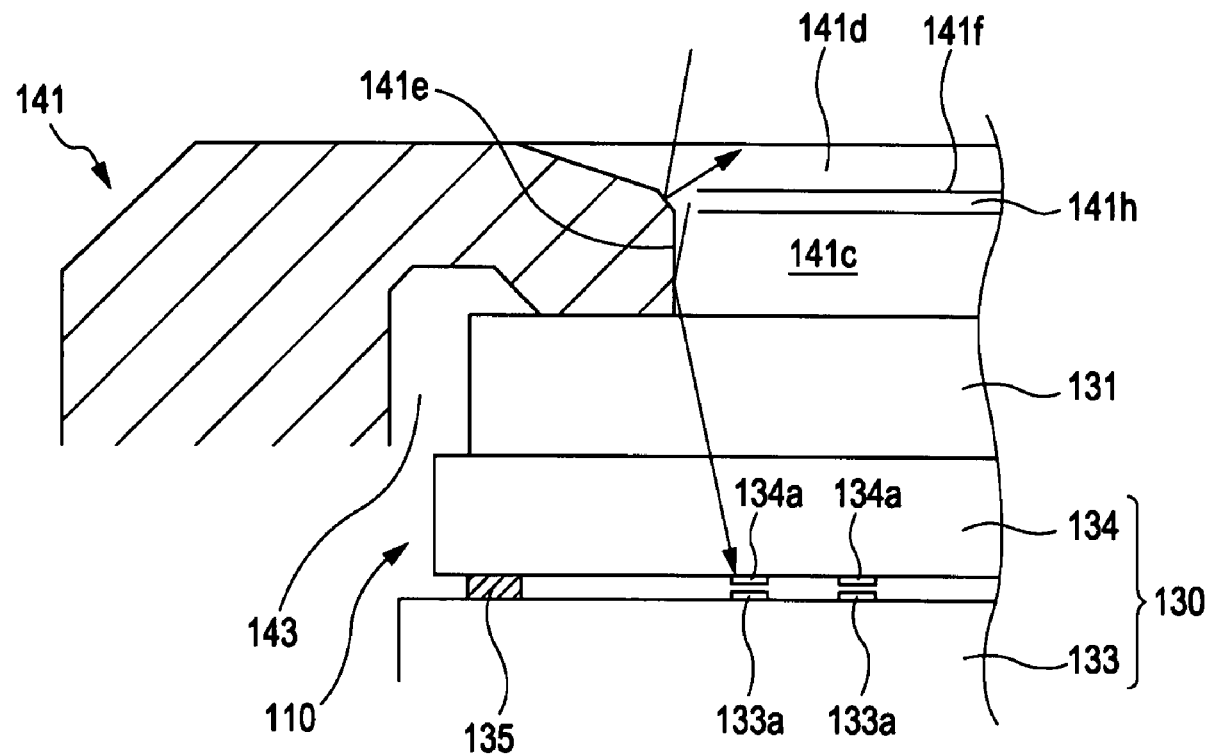
FIG. 12 is an enlarged cross-sectional view, corresponding to FIG. 6, according to a fourth embodiment.

FIG. 12 is an enlarged cross-sectional view, corresponding to FIG. 6, according to a fourth embodiment. In the first embodiment, the edge portions 141*f* serve as low-reflectivity portions by fabricating the edge portions 141*f* to substantially have a sharp radius of curvature R. In the fourth embodiment, each edge portion 141*f* is fabricated to have a groove 141*h* with a recessed cross section along the edge direction, thereby allowing the edge portion 141*f* to serve as a low-reflectivity portion.

That is, the groove 141*h* with a recessed cross section is formed so that diagonal light entering the groove 141*h* is reflected parallel to the display surface (effective pixel region) of the liquid crystal light valve 110 or in the direction away from the display surface of the liquid crystal light valve 110.

Because the groove 141*h* with a recessed cross section along the edge portion 141*f* reflects diagonal light entering the groove 141*h* parallel to the display surface of the liquid crystal light valve 110 or in the direction away from the liquid crystal light valve 110, no diagonal light entering the groove 141*h* is reflected to the liquid crystal light valve 110 or directed toward the wall 141*e* to cause double reflection. Accordingly, the generation of optical leakage current is further reduced.

The groove 141*h* with a recessed cross section may be formed simultaneously with the formation of the holding frame 141 using a mold, or the groove 141*h* may be formed by post processing. Since the groove 141*h* can be formed with a relatively large tolerance, the groove 141*h* can be easily molded or processed. In the case of post processing of the groove 141*h*, the edges formed on two sides along the groove 141*h* are inevitably sharpened. Thus, the amount of diagonal light reflected from the edges toward the liquid crystal light valve 110 is significantly reduced. In addition, as in the second and third embodiments, each wall 141*e* may be tapered parallel to the diagonal light or at an angle greater than the diagonal light.

Figure 13:
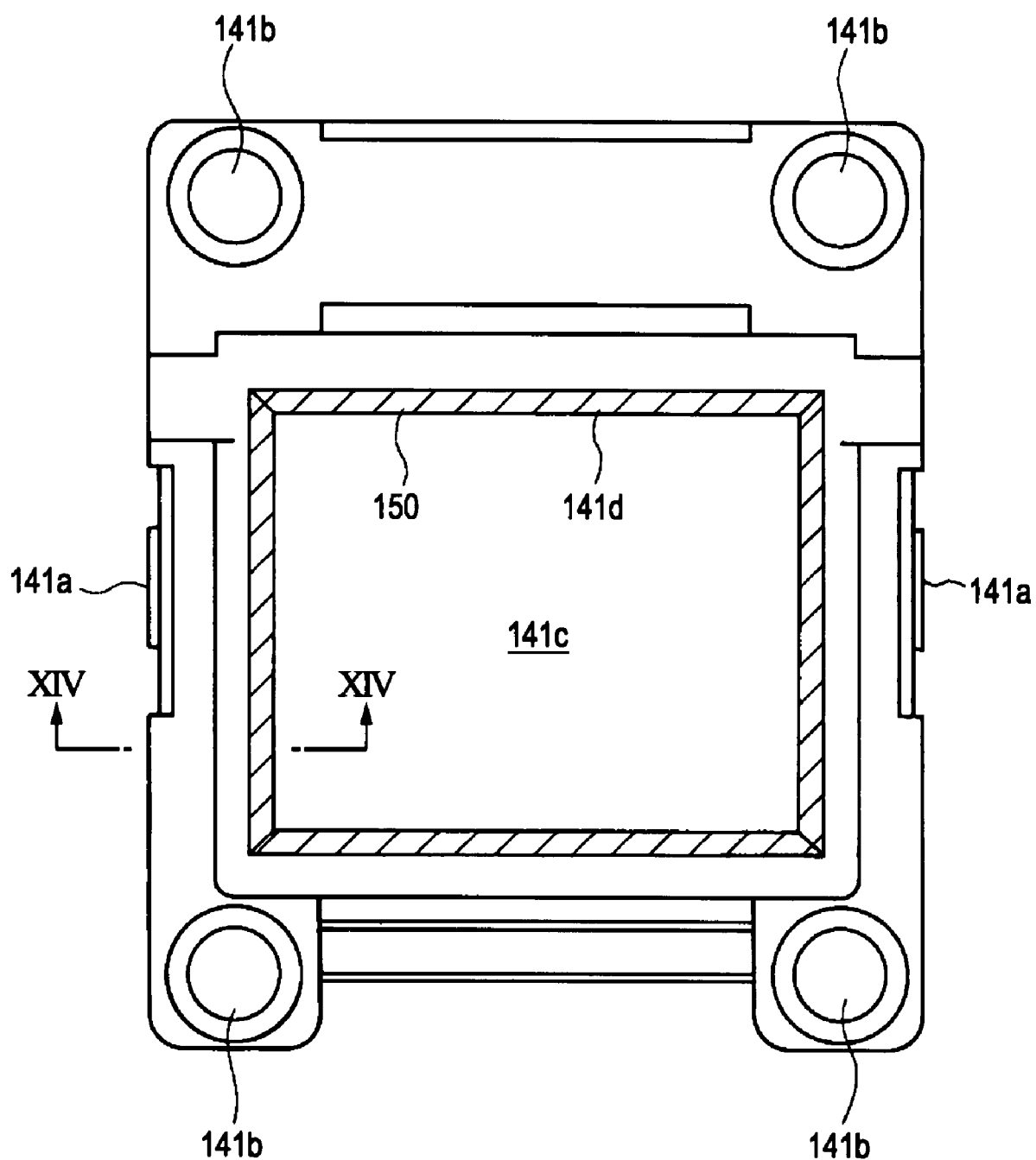
FIG. 13 is a front view of the holding frame according to a fifth embodiment.
Figure 14:
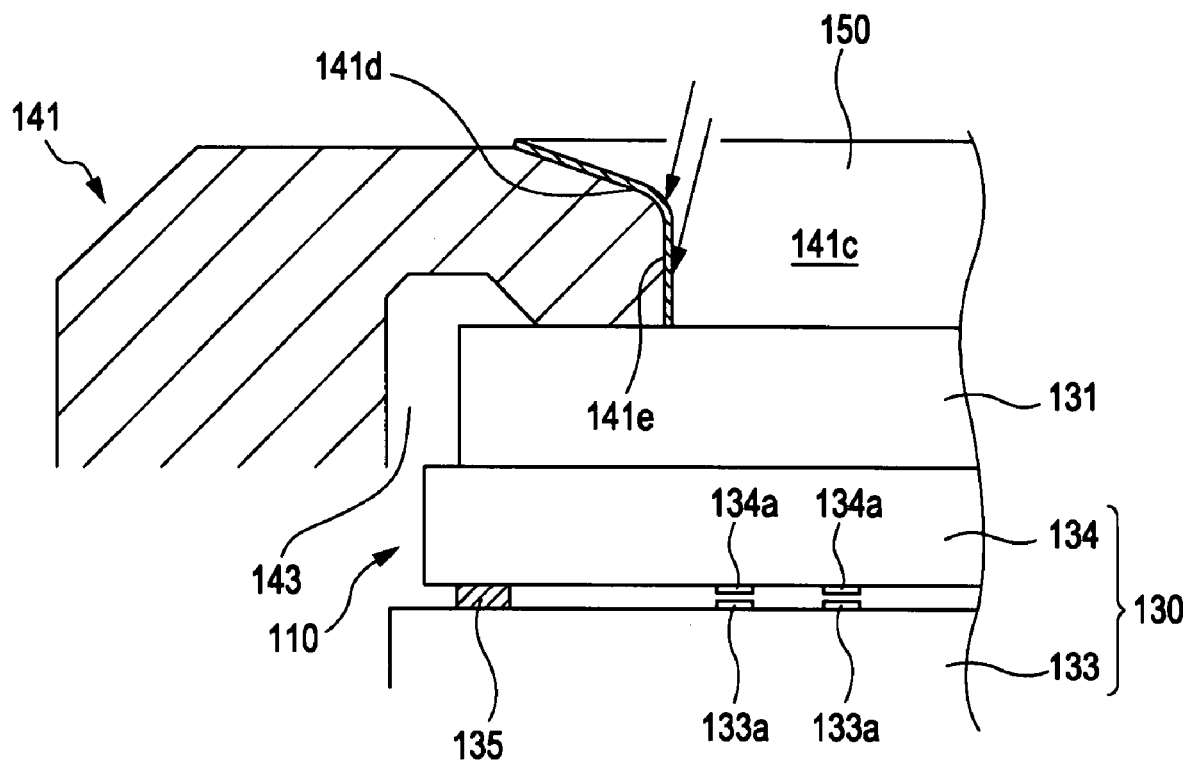
FIG. 14 is a cross-sectional view taken along the line XIV-XIV in FIG. 13.

FIGS. 13 and 14 show a fifth embodiment of the invention. FIG. 13 is a front view of the holding frame 141, and FIG. 14 is a cross-sectional view taken along the line XIV-XIV in FIG. 13. In FIGS. 13 and 14, the same reference numerals are used to denote the same blocks as those in the first embodiment, and descriptions thereof are omitted.

In the above-described embodiments, low-reflectivity portions are formed by the shape of the window frame 141*d*. In the fifth embodiment, the shape of the window frame 141*d* remains as it has in the past, and low-reflectivity portions are formed by disposing a low-reflectivity layer 150 in the window frame 141*d*.

As shown in FIGS. 13 and 14, the low-reflectivity layer 150 is disposed from each wall 141*e* of the window frame 141*d* to an upper edge of the incident side. The low-reflectivity layer 150 is formed using a material with a high light absorptivity, such as by painting, coating or plating the window frame 141*d* with a black material. In this case, the reflectivity can be further reduced by matting the low-reflectivity layer 150.

With this structure in which the window frame 141*d* has the low-reflectivity layer 150, the reflectivity of diagonal light from the window frame 141*d* toward the liquid crystal light valve 110 can be significantly reduced without applying a special process to the window frame 141*d*. Since this structure can be applied to known products, high versatility can be achieved.

The invention is not limited to the embodiments described above. Various changes, alterations, and modifications can be made without departing from the scope of the invention set forth in claims and the entire specification. Electro-optical devices with such modifications, and projectors and electronic apparatuses including the same are also included in the technical scope of the invention.

The electronic apparatus may include a head-up display (HUD), which is a type of display that presents an image projected from, for example, a projector embedded in an instrument panel of a vehicle using a mirror onto a screen on a front window (windshield). The liquid crystal device may include, besides a liquid crystal device using a TFT active matrix drive system, a passive-matrix liquid crystal device or a liquid crystal device having thin-film diodes (TFDs) as switching elements.

What is claimed is:

1. An electro-optical device comprising:
   a liquid crystal device; and
   a holder that holds the liquid crystal device, the holder including a window frame having an incident window through which a light beam emitted from a light source is transmitted to the liquid crystal device, the window frame having a low reflectivity portion with a low reflectivity with respect to diagonally incident light of the light beam from the light source, the low reflectivity portion comprising a low-reflectivity layer around a periphery of the window frame.

2. The electro-optical device according to claim 1, wherein the low-reflectivity layer is formed by a painting, coating, or plating process using a material with a high light absorptivity.

3. A projector comprising:
   an electro-optical device according to claim 1;
   a light source that emits a light beam to the electro-optical device; and
   a projection lens that enlarges and projects an image from the electro-optical device onto a screen.

4. The electro-optical device according to claim 1, wherein the low-reflectivity layer is matted.

* * * * *